US011033142B2

(12) United States Patent
Zwick

(10) Patent No.: US 11,033,142 B2
(45) Date of Patent: Jun. 15, 2021

(54) SMALL CONICAL FILTER PLATE

(71) Applicant: ÜBERMORGEN INNOVATIONS GMBH, Aachen (DE)

(72) Inventor: Boris Zwick, Stutensee (DE)

(73) Assignee: UBERMORGEN INNOVATIONS GMBH (*) Notice: Subject to any disclaimer, the term of this patent is extended or adjusted under 35 U.S.C. 154(b) by 277 days.

(21) Appl. No.: 15/999,351

(22) PCT Filed: Feb. 16, 2017

(86) PCT No.: PCT/EP2017/053549
§ 371 (c)(1),
(2) Date: Aug. 17, 2018

(87) PCT Pub. No.: WO2017/140809
PCT Pub. Date: Aug. 24, 2017

(65) Prior Publication Data
US 2019/0075962 A1 Mar. 14, 2019

(30) Foreign Application Priority Data
Feb. 17, 2016 (DE) .................. 10 1016 102 795.2

(51) Int. Cl.
A47J 31/00 (2006.01)
A47J 31/44 (2006.01)
A47J 31/46 (2006.01)
A23P 30/40 (2016.01)
B01F 3/04 (2006.01)
B01F 5/04 (2006.01)
B01F 5/06 (2006.01)

(52) U.S. Cl.
CPC ........... A47J 31/4485 (2013.01); A23P 30/40 (2016.08); A47J 31/46 (2013.01); B01F 3/04446 (2013.01); B01F 5/0476 (2013.01); B01F 5/0691 (2013.01)

(58) Field of Classification Search
CPC ....... A47J 31/4485; A47J 31/46; A23P 30/40; B01F 5/0691; B01F 3/04446; B01F 5/0476
See application file for complete search history.

(56) References Cited

U.S. PATENT DOCUMENTS 3,094,060 A 6/1963 Menoret et al.
3,428,413 A 2/1969 Froelich
(Continued)

FOREIGN PATENT DOCUMENTS

DE 102010023781 B4 9/2015
WO 2009110794 A1 9/2009

OTHER PUBLICATIONS

International Search Report, PCT/EP2017/053549, dated May 4, 2017, 2 pages.
Written Opinion, PCT/EP2017/053549, dated May 4, 2017, 5 pages.

Primary Examiner — Anshu Bhatia
(74) Attorney, Agent, or Firm — Stinson LLP

(57) ABSTRACT

A filter element for filtering milk in a milk frother, comprising a plate-shaped porous main body, having a first side at which the milk can enter the porous main body, a second side at which the milk can exit from the porous main body, and a lateral side connecting the first and second sides, wherein the surface of the first side is less rough than the surface of the second side, and wherein the first side and the second side are different from one another.

19 Claims, 4 Drawing Sheets

(56) References Cited

U.S. PATENT DOCUMENTS

| | | | | |
|---|---|---|---|---|
| 5,780,087 A | * | 7/1998 | Brady | A23C 9/1524 |
| | | | | 366/256 |
| 6,231,909 B1 | | 5/2001 | Levinson | |
| 2010/0295194 A1 | * | 11/2010 | Bodum | A47J 43/1093 |
| | | | | 261/83 |
| 2014/0299001 A1 | | 10/2014 | Rimpl | |

* cited by examiner

SMALL CONICAL FILTER PLATE

REFERENCE TO RELATED APPLICATIONS

This application is a US national stage application based on PCT/EP2017/0539549 filed Feb. 16, 2017 and claims priority to German application DE 10 2016 102 795.2 filed Feb. 17, 2016, the entire disclosures of which are incorporated herein by reference.

FIELD

The present invention relates to a filter element having a porous body and a milk frother comprising the filter element.

BACKGROUND

A filter element according to the preamble of claim 1 is known from DE 10 2010 023 781 B2. This filter element has the disadvantage that the porous main body is normally produced with a rough side and a smooth side. While filter residues are rather simple to remove from the smooth side, they frequently collect on the rough side and can only be removed inadequately therefrom. The filter element thus has to be replaced sooner.

SUMMARY OF THE INVENTION

The object of the invention is to improve the ability to clean the filter element and thus enhance its service life.

The object is achieved by the features of the characterizing part of claim 1. Preferred refinements are the subject matter of the dependent claims.

The filter element according to claim 1 is based on the consideration that the main body may in principle be inserted with either side in front into a milk channel of the milk frother. Either the smooth side or the rough side is then randomly the side of the filter element receiving the milk. The user cannot recognize the surface roughness of the two sides with the naked eye. The invention engages here with the proposal of forming the two sides so that they are recognizably different from one another. In this manner, the user has the possibility of recognizing which side he inserts as the milk-receiving side into the milk channel.

With the filter element as claimed in claim 2, it is possible to form the sides by different shaping such that the filter element is only insertable into the milk channel with the smooth side opposing the milk flow direction. In this manner, the option is taken from the user of inserting the rough side opposing the milk flow direction, and therefore he does not have to first learn the correct side orientation and needs to look it up in a handbook, for example.

The filter element as claimed in claim 3 is particularly simple to manufacture.

The filter element as claimed in claim 4 can be used like a plug in a tubular milk channel, and therefore possible seals can be omitted.

The filter element as claimed in claim 5 is particularly mechanically stable.

One of the specified filter elements can be used in the milk frother of claim 6.

The filter element can be inserted and removed particularly easily in the milk frother according to claim 7.

BRIEF DESCRIPTION OF THE FIGURES

The above-described properties, features, and advantages of this invention and the manner in which they are achieved will become more comprehensible in conjunction with the following description of the exemplary embodiments, which are explained in greater detail in conjunction with the drawings. In the figures.

In the figures, identical technical elements are provided with identical reference signs and are only described once. The figures are solely schematic and above all do not reflect the actual geometric relationships.

DETAILED DESCRIPTION OF PREFERRED EMBODIMENTS

Figure 1:
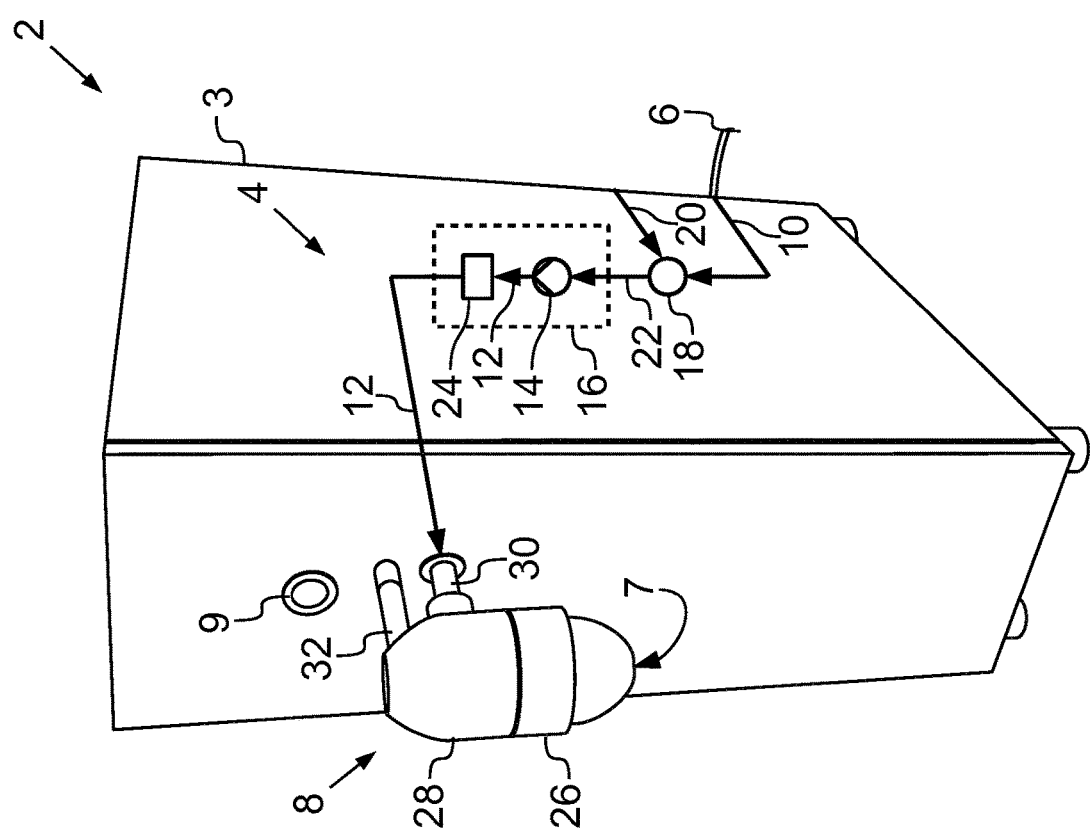
FIG. 1 shows a perspective view of a milk frother comprising a milk outlet head.

Reference is made to FIG. 1, which shows a milk frother 2 in a perspective illustration. The individual elements in the interior of the milk frother 2 are only structurally indicated.

The milk frother 2 comprises a milk channel 4, which extends through a housing 3, and which extends starting from a milk intake tube 6 up to an outlet opening 7 of a milk outlet head 8. In operation of the milk frother 2, when an operating button 9 is pressed on the housing 3 of the milk frother 2, milk 10 is suctioned into the milk channel 4 via the milk intake tube 6 from a milk container (not shown in greater detail) and processed to form a milk foam 12 and discharged at the outlet opening 7 on the milk outlet head 8.

To produce the milk foam 12, a pump 14 suctions the milk 10 into a foaming section 16. The milk 10 is enriched with air 20 in this case via a Venturi nozzle 18 arranged before the pump 14, and therefore the milk 22 permeated with air 20 enters the pump 14 and is mixed therein. The milk foam 12 fundamentally results in this manner. In an adjoining temperature control element 24, the milk foam 12 is then reprocessed and heated, for example, which results in an expansion of the air bubbles located in the milk foam 12 and stabilization of the milk foam 12.

Further details of the milk frother 2 can be inferred from DE 10 2010 023 781 B2.

The milk outlet head 8 has a lower housing shell 26 and an upper housing shell 28. A milk channel 30 for the milk foam 12 leads into the upper housing shell 28. Furthermore, the upper housing shell 28 is fixed via a retention strut 32 on the housing 3. The milk foam 12 can be discharged into a cup or the like via the outlet opening 7, which is not visible in FIG. 1 but is indicated by a reference sign.

Figure 3:
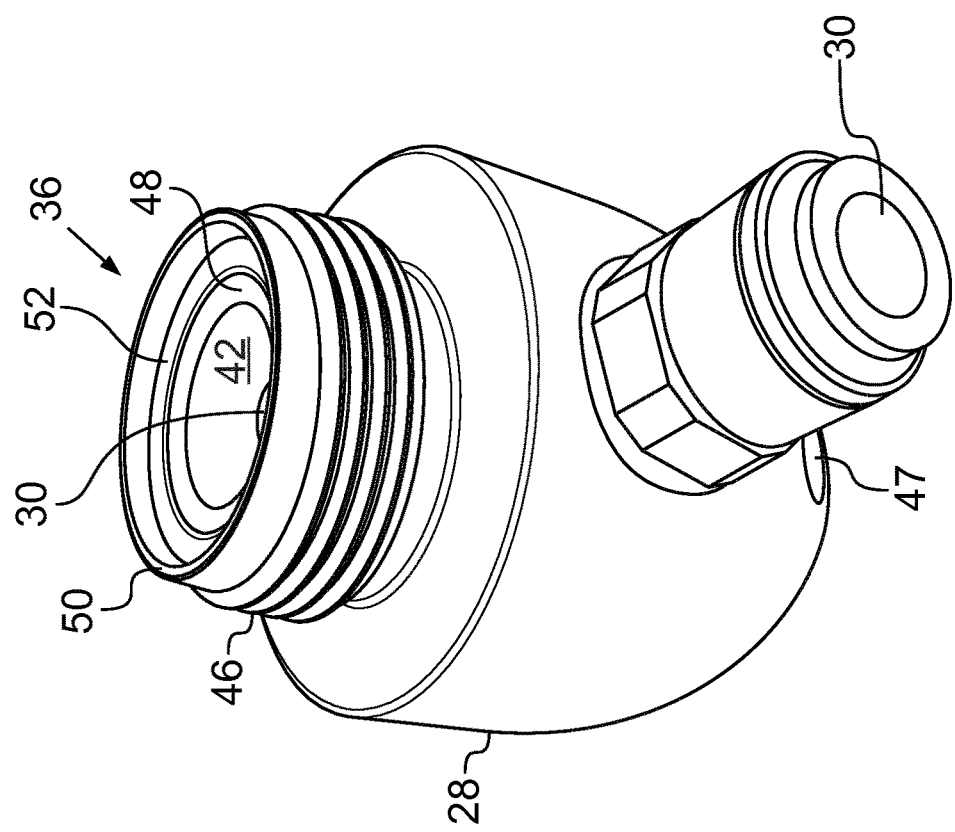
FIG. 3 shows a perspective view of an upper housing shell of the milk outlet head of FIG. 1.
Figure 2:
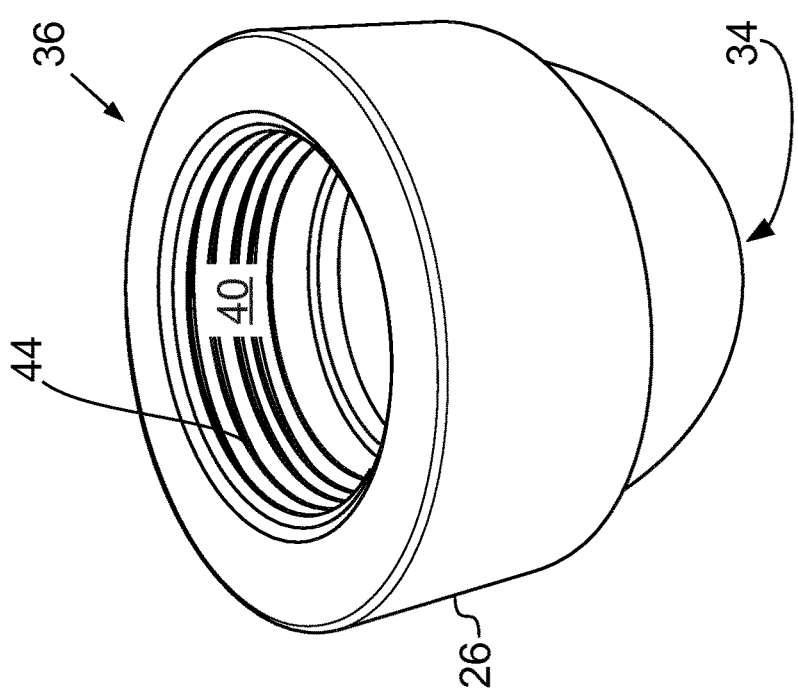
FIG. 2 shows a perspective view of a lower housing shell of the milk outlet head of FIG. 1.
Figure 4:
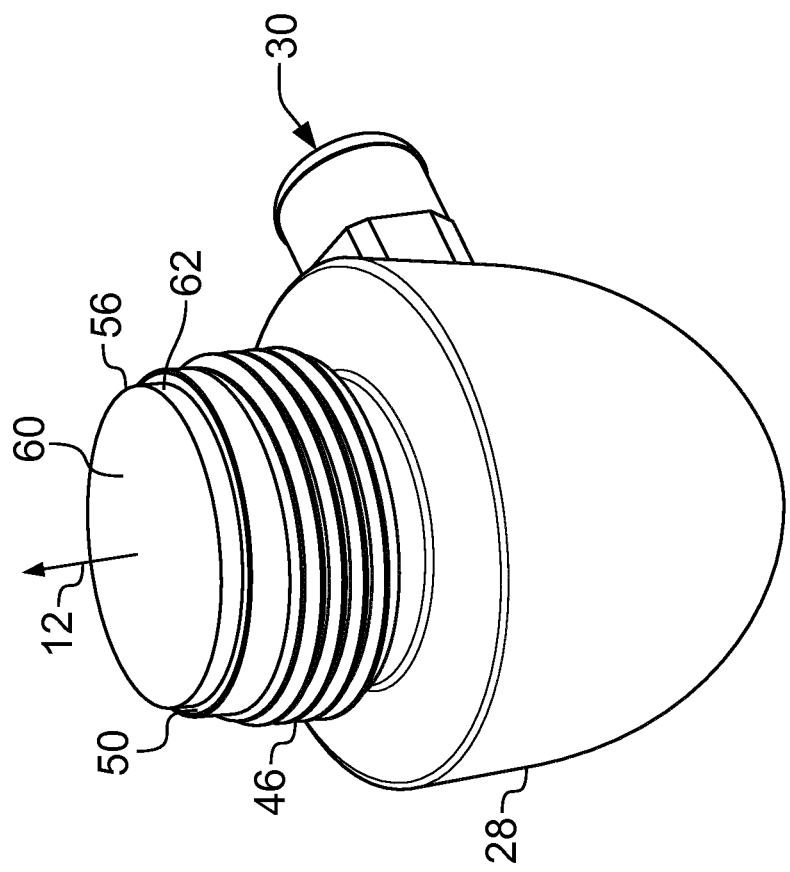
FIG. 4 shows a perspective view of the upper housing shell of FIG. 3 with a filter element inserted therein.

The interior 36 of the milk outlet head 8 housed by the two housing shells 26, 28 will be explained in greater detail hereafter on the basis of FIGS. 2 to 4.

The milk foam 12 is guided in the interior 36 via the milk channel 30 and filtered by means of a filter element 38 accommodated therein. The interior 36 is formed by a first half space 40 in the lower housing shell 26 and a second half apace 42 in the upper housing shell 28. An internal thread 44 is formed on a jacket-side wall in the first half space 40, which can be screwed into an external thread 46, which is formed on a lateral surface of a hollow cylinder on the upper housing shell 28. Furthermore, a receptacle opening 47 for the retention strut 32 is also formed on the upper housing shell 28.

Figure 5:
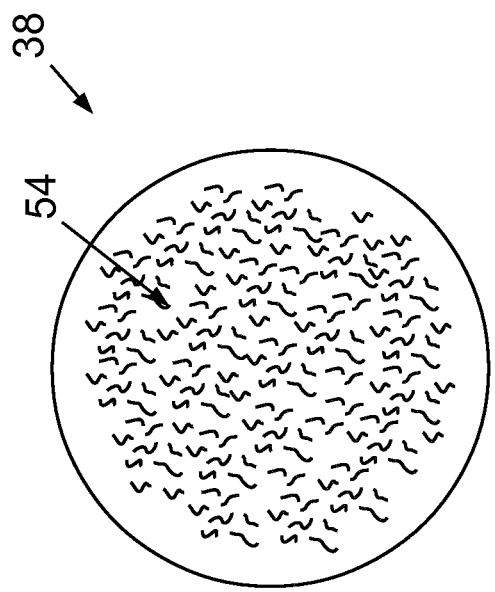
FIG. 5 shows a top view of a used filter element.

The hollow cylinder has a shoulder 48, at the radial end of which a cylinder wall 50 continues axially. A seal ring 52 can be placed on the shoulder 48. Radially inside the shoulder 48, the milk channel 30 enters the second half space 40 of the interior 36. If the filter element 38 is placed on the shoulder 48, as shown in FIG. 4, the interior 36 is then separated between the first half space 40 and the second half space 42. The milk foam 12 entering the second half space 42 passes the filter element 38, which in turn filters dirt particles 54 out of the milk foam 12, which are shown by way of example in FIG. 5.

Figure 7:
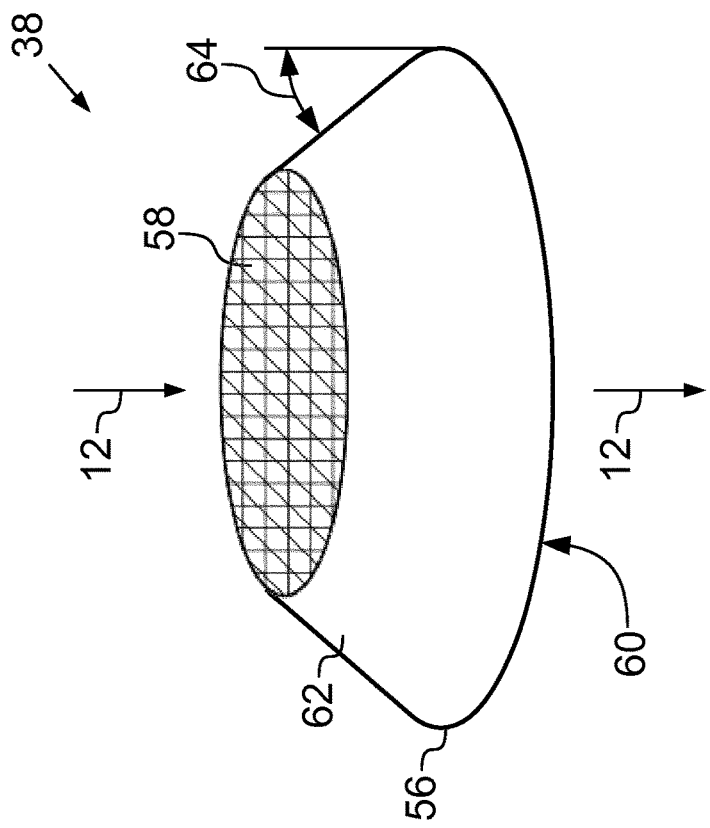
FIG. 7 shows a perspective schematic illustration of the filter element from FIG. 6 in a second position.
Figure 6:
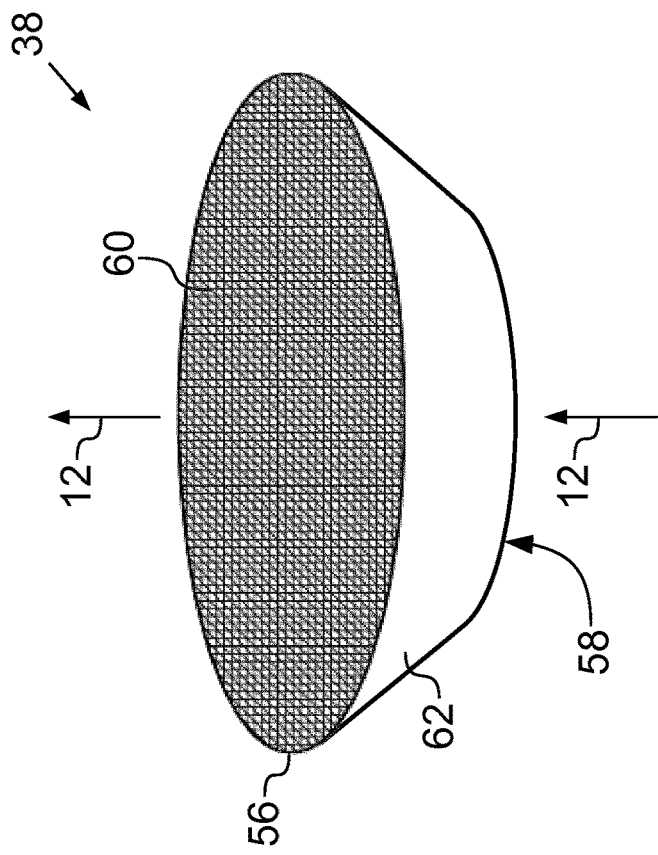
FIG. 6 shows a perspective schematic illustration of the filter element from FIG. 4 in a first position.

This filter element 38 will be described in greater detail hereafter on the basis of FIGS. 4, 6, and 7.

The filter element 38 comprises a plate-shaped porous main body 56 having a first side 58, at which the milk foam 12 can enter the porous main body 56 from the second half space 42, a second side 60, at which the milk foam 12 can exit from the porous main body 56 into the first half space 40, and a lateral side 62, which connects the first side 58 and the second side 60.

In the filter element, the surface of the first side 58 is less rough than the surface of the second side 60, i.e., the first side 58 is smoother than the second side 60. The lesser surface roughness of the first side 58 is indicated in FIGS. 6 and 7 by shading which is less dense than the second side 60. Because of the lesser surface roughness, the contaminants 54 from FIG. 5 may be removed from the first side 58 more easily than from the second side 60, because of which the contaminants collect less strongly on the first side 58 than on the second side 60.

It would therefore be desirable to insert the filter element 38 with the smoother first side 58 in front into the second half space 42. To enable this, the first side 58 differs from the second side 60 such that only the first side can be inserted into the second half space 42. This is implemented in the present embodiment in that the size of the two sides 58, 60 is different. If the filter element 38 is inserted with the first side 58 in front into the second half space 42, the porous main body 56 thus penetrates partially therein. However, if one attempts to insert the filter element 38 with the second side 60 in front into the second half space 42, the second side 60 strikes against the cylinder wall 50 and the porous main body 56 may not be inserted into the second half space 42. The user therefore already notices solely because of this that he is attempting to insert the filter element 38 with the wrong side 60 in front into the second half space 42, because the filter element 38 cannot be inserted with a solid hold therein.

The porous main body 56 is embodied in the present embodiment in the form of a rotationally-symmetrical truncated cone. This rotational symmetry additionally has the advantage that the truncated cone is applied as a type of plug to the cylinder wall 50 and can in principle effectively separate the two half spaces 40, 42 from one another even without the seal 52. The seal 52 could therefore be completely omitted in principle. Fewer parts subject to wear, which could result in failures, are present in the milk frother 2 in this way.

To nonetheless keep the porous main body as stable as possible, a pitch angle 64 between a surface normal of the two sides 58, 60 and the lateral side 62 is not to be selected as excessively large. In practice, at most 15° has proven to be suitable. The invention is particularly effective with a pitch angle 64 between 1° and 2°.

It is apparent that the design of the sides 58, 60 is dependent on where the cylinder wall 50 is formed. If the cylinder wall 50 is formed on the lower housing shell 26, the cut-off conical shape of the filter element 38 in FIGS. 6 and 7 thus has to be embodied as precisely inverted to these figures. Where the smooth side 58 is arranged, i.e., on the top or bottom of the truncated cone, is thus dependent on the construction of the milk frother 2 in which the filter element 38 is used.

The invention claimed is:

1. A filter element for filtering milk in a milk frother, comprising:
    a plate-shaped porous main body having a first side, at which the milk can enter the porous main body, a second side, at which the milk can exit from the porous main body, and a lateral side connecting the first and second sides,
    wherein the surface of the first side is less rough than the surface of the second side, and the first side and the second side are different from one another,
    wherein the main body has a truncated cone shape having a first cone side, a second cone side parallel to the first side and having a larger diameter than the first cone side, and lateral side walls separating the first and second cone sides,
    wherein the first side of the filter element corresponds to the first cone side of the truncated cone shape and the second side of the filter element corresponds to the second cone side of the truncated shape having the larger diameter,
    wherein the lateral side walls of the cone shape have an angle of less than 15° between the lateral side walls and an axis of rotation of the cone shape,
    wherein the filter element is a component of a milk frother comprising a milk channel for suctioning milk out of a milk container, an air enrichment element for permeating the milk in the milk channel with air, a foaming section in the milk channel for converting the milk enriched with air in the milk channel into a milk foam, and a milk outlet head in the milk channel for discharging the milk foam, and
    wherein the milk channel comprises a first half space and a second half space distinct from the first half space, the second half space in the milk channel being sized to receive the first side of the filter element and too small to receive the second larger diameter side of the filter element such that the first side of the filter element is the only side which can be inserted into the second half space in the milk channel.

2. The filter element as claimed in claim 1, wherein the first side and the second side are different from one another in their shapes.

3. The filter element as claimed in claim 2, wherein the main body has the shape of a rotationally symmetrical truncated cone.

4. The filter element as claimed in claim 3, wherein an angle between the axis of rotation of the truncated cone and the lateral side is less than 15°.

5. The filter element as claimed in claim 4, wherein said angle between the axis of rotation of the truncated cone and the lateral side is between 1° and 2°.

6. The filter element as claimed in claim 1, wherein the main body has the shape of a truncated cone at least in sections.

7. The filter element as claimed in claim 6, wherein the truncated cone is rotationally symmetrical.

8. The filter element as claimed in claim 7, wherein an angle between the axis of rotation of the truncated cone and the lateral side is less than 15°.

9. The filter amendment as claimed in claim 1, wherein said angle between the lateral side walls and the axis of rotation of the cone shape is between 1° and 2°.

10. A filter element for filtering milk in a milk frother, comprising:
- a plate-shaped porous main body having a first side, at which the milk can enter the porous main body, a second side, at which the milk can exit from the porous main body, and a lateral side connecting the first and second sides,
- wherein the surface of the first side is less rough than the surface of the second side, and the first side and the second side are different from one another,
- wherein the filter element is a component of a milk frother comprising a milk channel for suctioning milk out of a milk container, an air enrichment element for permeating the milk in the milk channel with air, a foaming section in the milk channel for converting the milk enriched with air in the milk channel into a milk foam, and a milk outlet head in the milk channel for discharging the milk foam.

11. The filter element as claimed in claim 10, wherein the first side and the second side are different from one another in their shapes.

12. The filter element as claimed in claim 11, wherein the main body has the shape of a rotationally symmetrical truncated cone.

13. The filter element as claimed in claim 12, wherein an angle between the axis of rotation of the truncated cone and the lateral side is less than 15°.

14. The filter element as claimed in claim 13, wherein said angle between the axis of rotation of the truncated cone and the lateral side is between 1° and 2°.

15. The filter element as claimed in claim 10, wherein the main body has the shape of a truncated cone at least in sections.

16. The filter element as claimed in claim 15, wherein the truncated cone is rotationally symmetrical.

17. The filter element as claimed in claim 16, wherein an angle between the axis of rotation of the truncated cone and the lateral side is less than 15°.

18. The filter element as claimed in claim 10, wherein:
- the main body has a truncated cone shape having a first cone side, a second cone side parallel to the first side and having a larger diameter than the first cone side, and lateral side walls separating the first and second cone sides,
- the first side of the filter element corresponds to the first cone side of the truncated cone shape,
- the second side of the filter element corresponds to the second cone side of the truncated shape having the larger diameter,
- the lateral side walls of the cone shape have an angle of less than 15° between the lateral side walls and an axis of rotation of the cone shape.

19. The filter element as claimed in claim 18, wherein said angle between the lateral side walls and the axis of rotation of the cone shape is between 1° and 2°.

* * * * *